Nov. 15, 1927. 1,649,632
J. WHITAKER
POWER CHECK WRITER
Filed Dec. 5, 1925 12 Sheets-Sheet 7

Inventor
John Whitaker
by his Attorney
Howson &
Howson

Nov. 15, 1927.  1,649,632

J. WHITAKER

POWER CHECK WRITER

Filed Dec. 5, 1925  12 Sheets-Sheet 8

Inventor-
John Whitaker
by his Attorneys
Howson & Howson

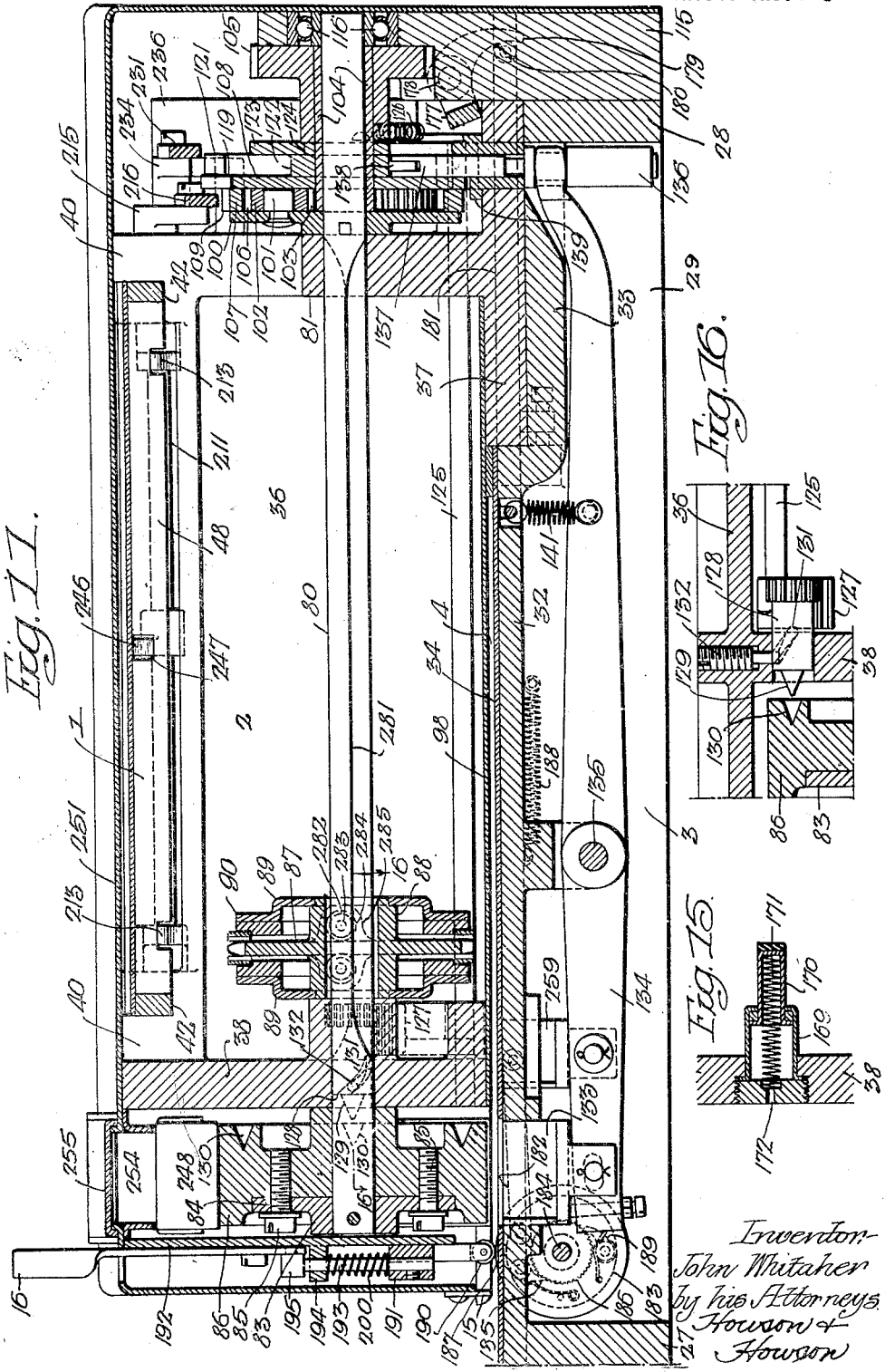

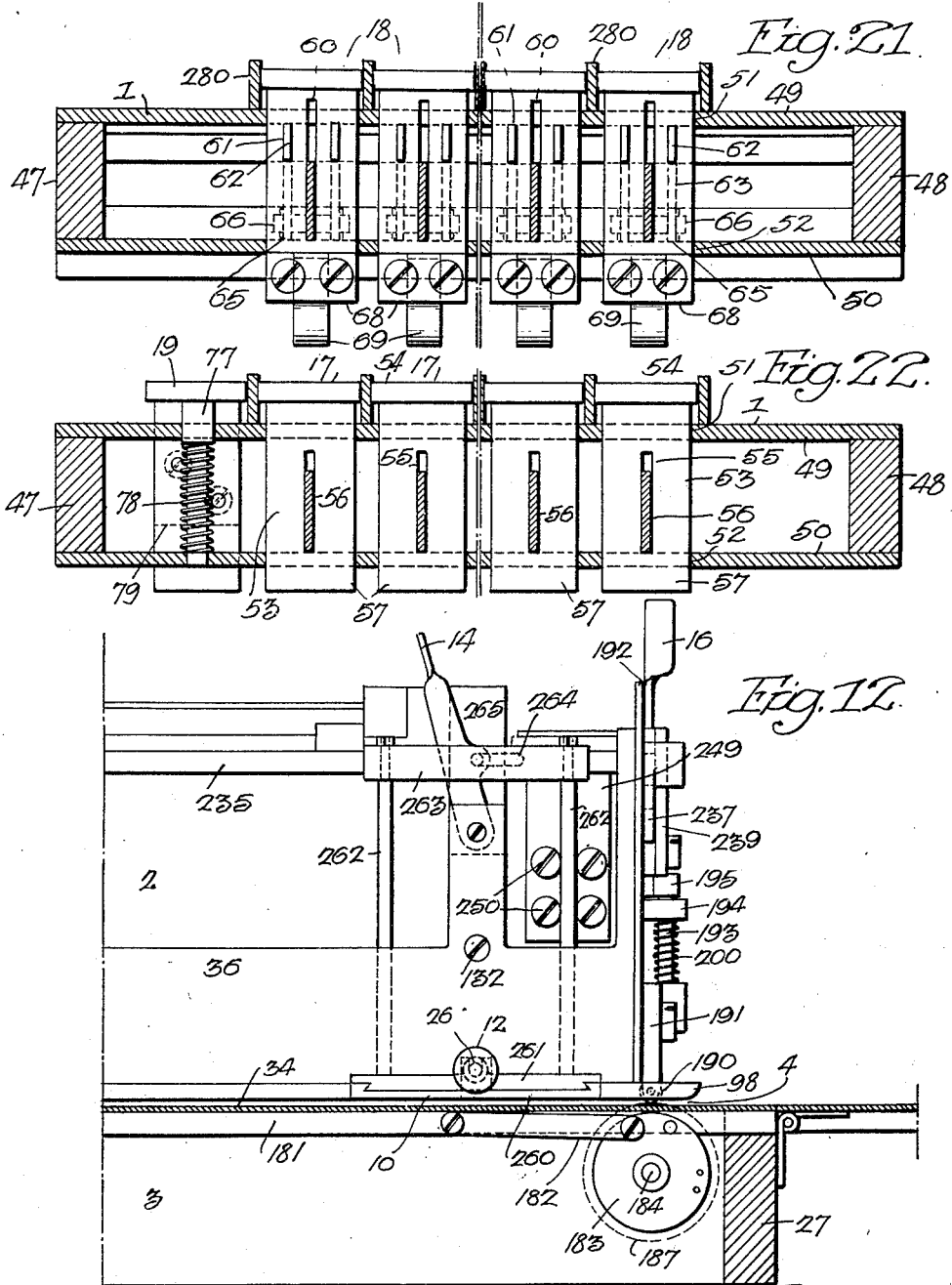

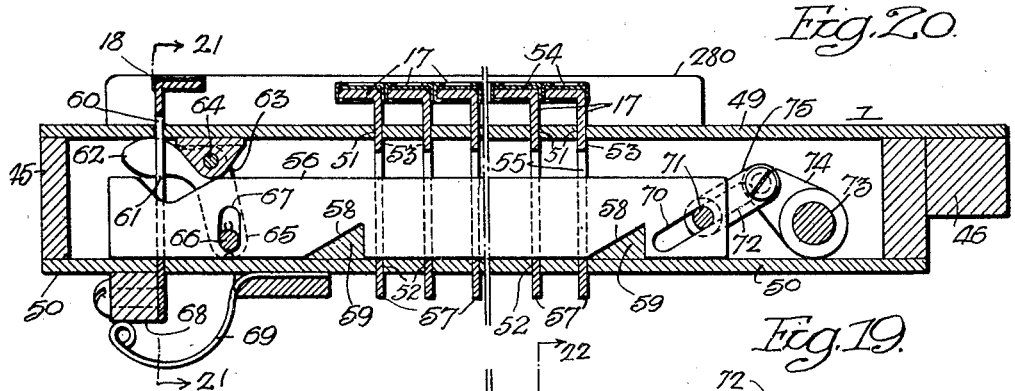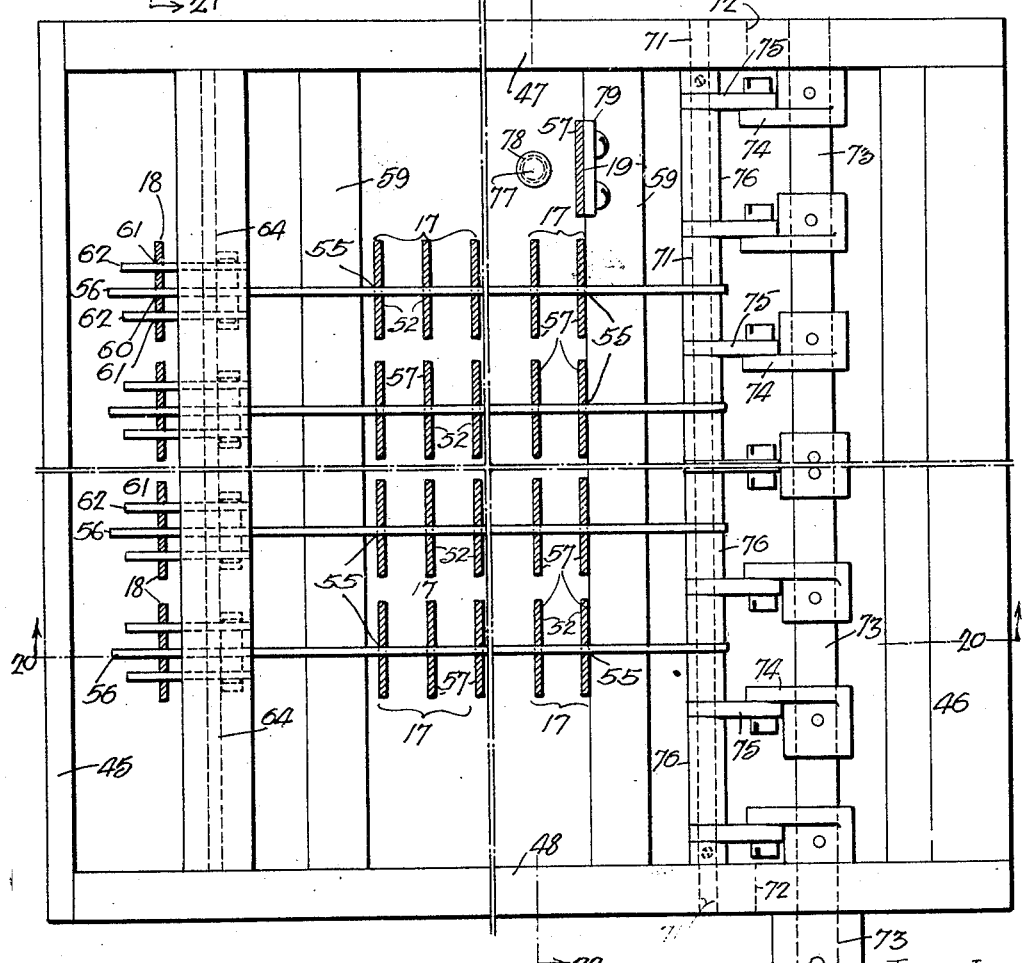

Nov. 15, 1927.

J. WHITAKER

POWER CHECK WRITER

Filed Dec. 5, 1925

Patented Nov. 15, 1927.

1,649,632

UNITED STATES PATENT OFFICE.

JOHN WHITAKER, OF LANSDALE, PENNSYLVANIA, ASSIGNOR, BY MESNE ASSIGNMENTS, TO BANKERS TRUST COMPANY, OF NEW YORK, N. Y.

POWER CHECK WRITER.

Application filed December 5, 1925. Serial No. 73,442.

The principal object of my invention is to provide a manually controlled power operated check writing machine which will accelerate and facilitate the writing of single checks or series of identical checks.

Another object of my invention is to provide a check writing machine of the above mentioned type with a keyboard on which the entire number of impressions to be made upon a check may be selected and successively registered and any one of such registrations withdrawn by the manipulation of an individual key controlling each selection, or the entire registration withdrawn by the manipulation of a single lever associated with the keyboard.

The keyboard is also provided with a control key for starting the automatic operation of the power driven impressing mechanism, whereby the selections previously registered on the keyboard will be successively impressed upon the check to be written.

Another object of the invention is to construct the check writing machine in such a manner that a series of identical checks may be produced from a single registration of selections by the operation of a single lever and the starting key after the writing of each check of such a series has been completed.

In the accompanying drawings

Fig. 9 is a sectional elevation taken on the line 9—9, Fig. 4;

Fig. 10 is a sectional elevation taken on the line 10—10, Fig. 4;

Fig. 11 is a sectional elevation taken on the line 11—11, Fig. 4;

Fig. 12 is a sectional elevation taken on the line 12—12, Fig. 4;

Fig. 13 is a plan view taken on the line 13—13, Fig. 7;

Fig. 14 is a sectional elevation taken on the line 14—14, Fig. 7;

Fig. 15 is a sectional elevation taken on the line 15—15, Fig. 8;

Fig. 16 is a sectional plan view taken on the line 16—16, Fig. 11;

Fig. 17 is a plan view of the retrieving mechanism.

Fig. 18 is an inverted plan view of the retrieving mechanism.

Fig. 19 is a sectional plan view taken on the line 19—19, Fig. 7;

Fig. 20 is a sectional elevation taken on the line 20—20, Fig. 19;

Fig. 21 is a sectional elevation taken on the line 21—21, Fig. 20;

Fig. 22 is a sectional elevation taken on the line 22—22, Fig. 19;

Fig. 23 is a diagrammatic view of a check and the keyboard, illustrating the process of manipulation of the selector keys necessary to cause the machine to form the impressions on the face of the check as illustrated.

Figure 1:
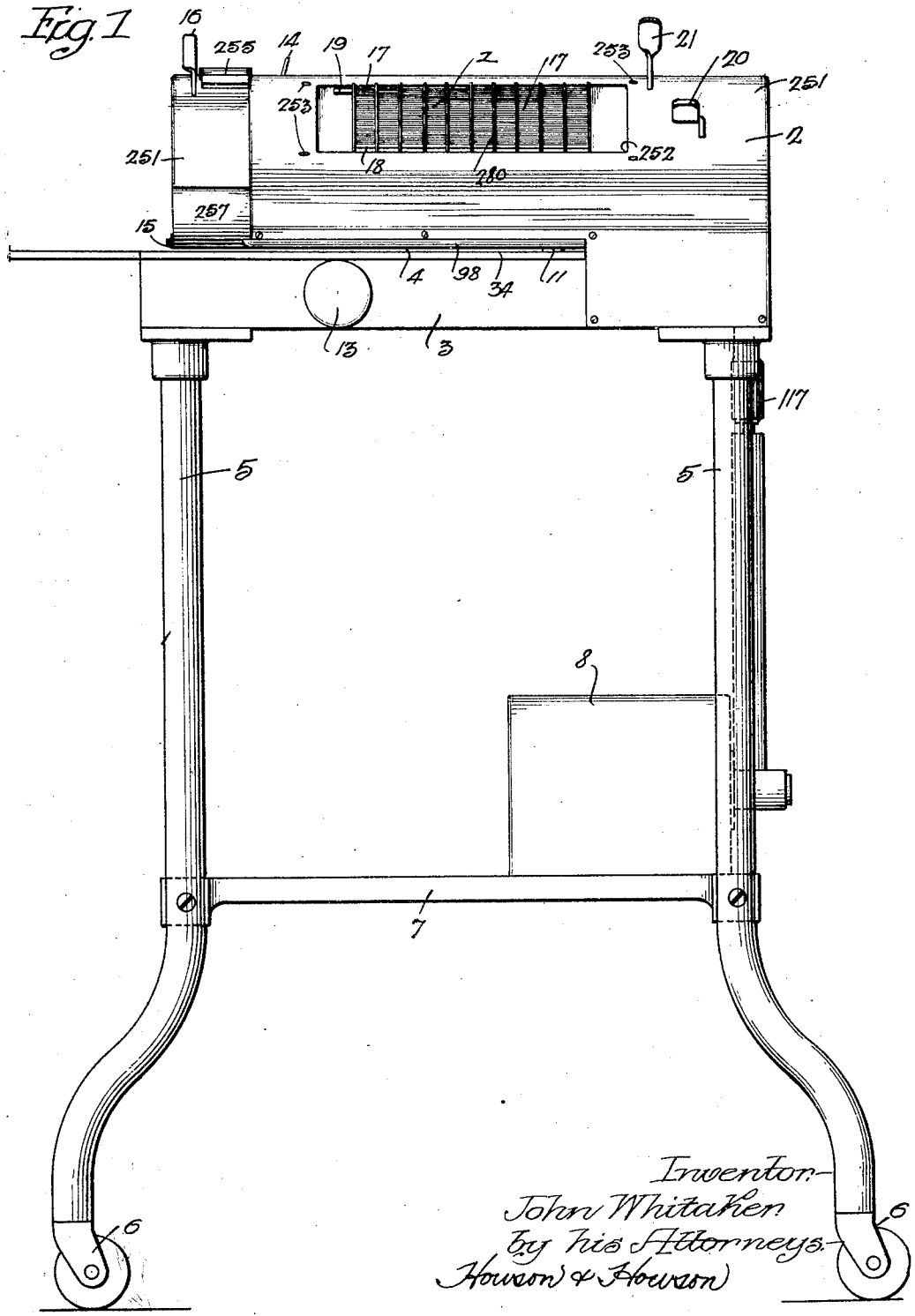
Figs. 1 and 2 are respectively a front elevation and plan view of a check writing machine constructed in accordance with the principles of my invention.
Figure 2:
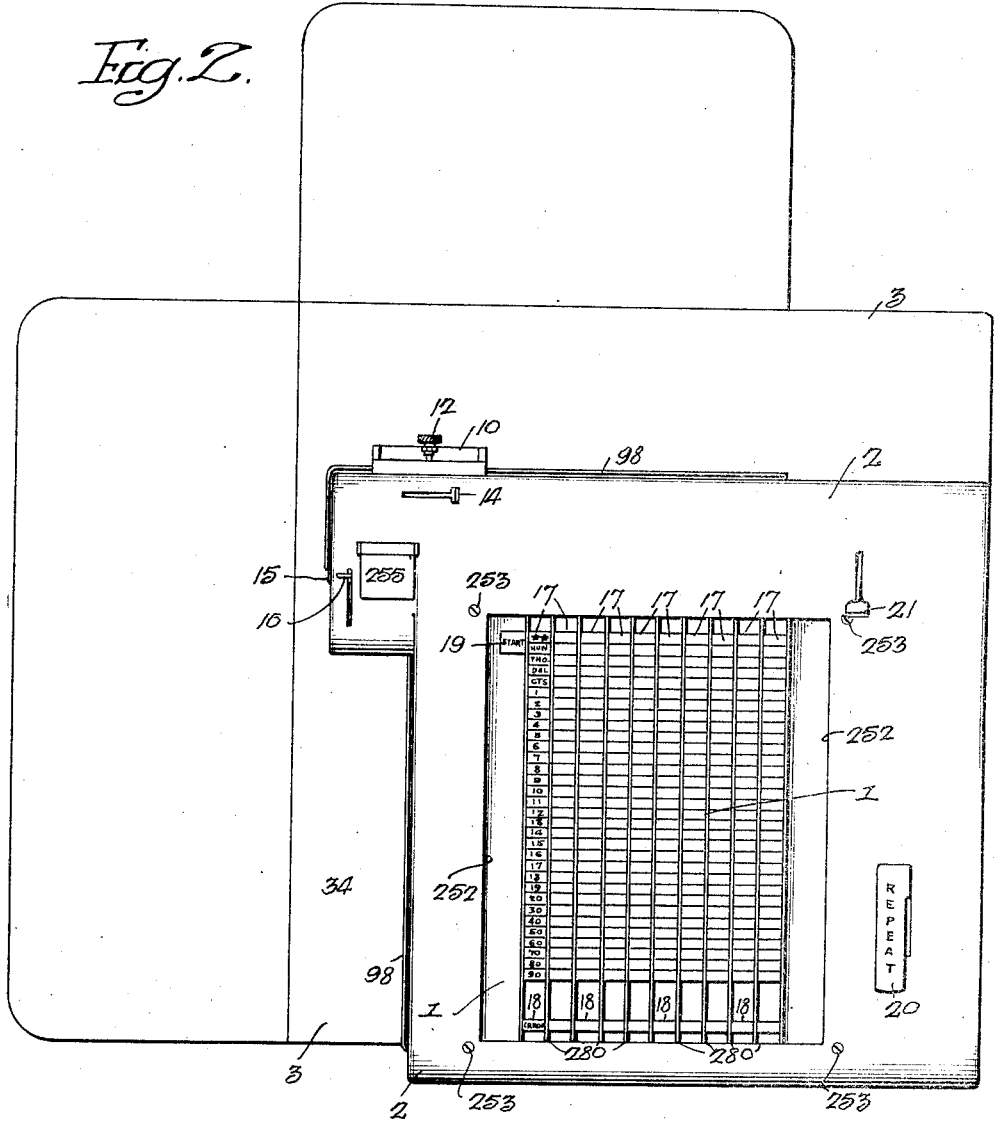
Figure 3:
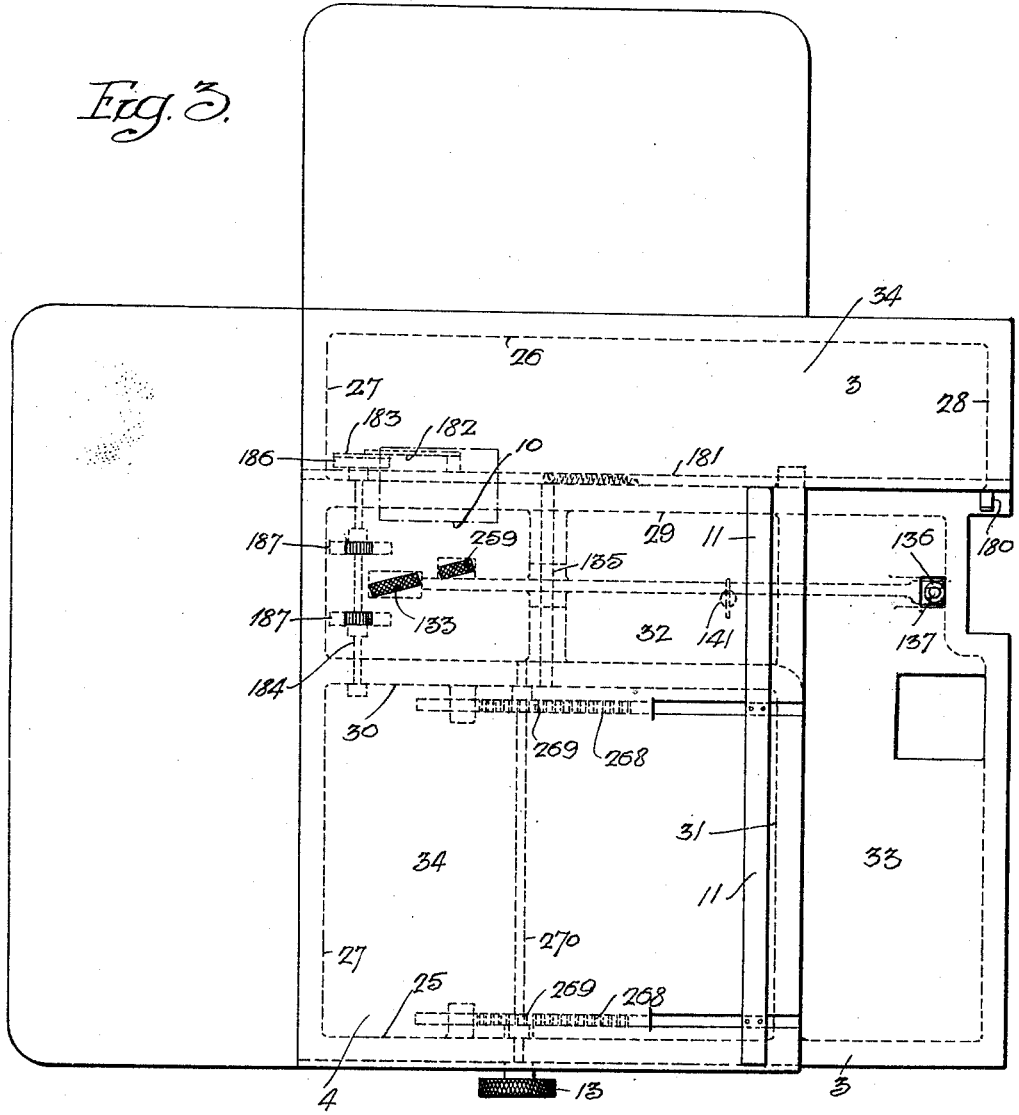
Fig. 3 is a plan view of the lower portion of the machine, the operating head thereof having been removed.

Referring to Figs. 1 and 2 of the drawings my improved check writing machine comprises, in general, a keyboard structure 1, suitably mounted in an operating head 2 which is secured along one of its sides to a base structure 3 its opposite side overhanging the said base structure in such a manner as to provide a passageway 4 into which a single blank check, or a series of checks in strip form, may be placed.

The base structure 3 of the machine is suitably mounted on a stand 5 provided with castors 6 and a shelf 7, in the present instance. On the shelf 7 is mounted an electric motor 8 for supplying the power by which the machine is operated. The usual flexible conductor (not shown) is provided to supply the necessary energy for the motor. Power may be supplied from other sources and through other means than that illustrated without departing from the essential features of the invention.

Adjustable guides, 10 and 11, are provided in the passageway 4 in order that the check to be written may be correctly positioned with respect to the impression mechanism of the machine. The guide 10 under control of a knob 12, governs the position the writing is to occupy with respect to the long edges of the check, while the guide 11 under control of a knob 13 governs the position of the writing with respect to the short edges of the check.

When checks in strip form are to be successively written the first check of such a strip is positioned as above stated and thereafter the guide 10 is raised clear of the passageway 4, by the manipulation of a lever 14, and the position of each succeeding check will be governed by an indicating arrow 15, secured to the head 2 and designed to register with the "amount line" appearing on all previously printed blank checks.

When the check to be written is satisfactorily positioned in the machine a lever 16 is manipulated to cause the check to be gripped between feeding wheels hereinafter more fully described.

The keyboard structure, as shown in Fig. 2, is provided with a number of separate and distinct series of registration keys 17, each key of a series being of a different character marking from the others of that particular series, but each series being identical with the other series on the keyboard. The different character markings on each key of any one series is similarly represented in the impression mechanism of the machine.

In order to write any given amount on a check, the check to be written is first placed in the slot 4 and positioned as above described. A selection of one character from each series of keys is successively registered in the various rows or series of keys on the keyboard, starting at the left hand side thereof, until the face value of the check to be written is completely registered on the keyboard, a typical example of such registration being clearly illustrated in Fig. 23.

Should an error be made in the selection or registration of the selection of a character in any row or series of keys such registration of selection can be withdrawn by the mere pressing of a withdrawal or "error" key, 18, at the foot of the particular row or series, in which the error appears and the correct selection registered immediately thereafter.

After the selection of characters have been registered completely the impression mechanism of the machine is set in operation by pressure being applied to the "start" key, 19, it being understood that the motor 8 has previously been started in the usual manner. As the characters are successively impressed upon the check, it is moved automatically step by step toward the left hand side of the machine by the feeding mechanism thereof until all the registered selections have been impressed on the check, whereafter the check remains quiescent and the mechanism of the machine merely idles.

If a second check is to be written, identical with the one just completed, the "repeat" lever 20 is operated, which automatically releases the completed check from the feeding mechanism and resets the impressing mechanism of the machine to its initial position, whereafter the completed check may be removed from the machine and a blank check substituted therefor. The blank check is positioned in the machine as above described, either for a single check or strip of checks, as the case may be, and by pressing the "start" key 19 the check is automatically gripped by the feeding mechanism and the impressing mechanism set into motion as above described.

Should it be desired to make a minor change of the character selections to be written on the next check the corresponding "error" key, 18, may be operated and the change made as above described after pressing the "repeat" lever 20, and before pressing the "start" key 19, but if the next check to be written is different entirely in face value from those previously written a keyboard clearing lever 21 on the head 2 should be manipulated, which releases the completed check, resets the impression mechanism and withdraws all the character registrations on the keyboard, whereafter the machine is ready for new registrations.

The base structure, 3, consists of a substantially rectangular open frame comprising front, back and side bars 25, 26, 27 and 28 respectively. Extending parallel to the rear bar 26, from side bar 27 to side bar 28 is an intermediate bar 29. Extending from the side bar 27 to the front bar 25 is a right angle bar comprising legs 30 and 31. The upper side of the frame 3 between the bars 29—30 and 27—31 is closed by an integral web 32 while the area outlined by the bars 29—25 and 31—28 is likewise closed by an integral web 33, but on a plane lower than that of the web 32. A sheet metal plate 34 is provided to close the entire upper side of the frame 3 with the exception of the web 33.

The head 2 comprises a substantially rectangular integral housing consisting of front and rear walls 35, and 36 respectively, a bottom plate 37 extending between the front and rear walls adjacent one side of the head 2, the opposite side consisting of a wall 38, integrally connecting the front and rear walls 35 and 36. The bottom plate 37 lies within the depression in the base structure 3 formed by the web 33 to which it is rigidly secured in any suitable manner. The above described construction comprising the base structure 3 and operating head 2 provides a substantially rigid foundation for the support of the operating elements of the machine.

The front and rear walls 35 and 36 of the head 2 are provided with upwardly extending projections 39—39 and 40—40 respectively, forming guides for the keyboard structure 1, permitting a substantially vertical movement of the keyboard structure for purposes which will be more fully described hereinafter. The projections 39—39 and 40—40 are provided with shoulders 41—41 and 42—42 on which the keyboard structure 1 normally rests, longitudinal movement of said keyboard structure being prevented by a bar 43 extending between and secured to the projections 39—39, at the lower end or front of the keyboard and limit blocks 44—44 secured to the projections 40—40 at the upper end or back of the keyboard structure.

The keyboard structure 1 (Figs. 19, 20, 21 and 22) comprises a rectangular open frame consisting of front, rear and side bars 45, 46, 47 and 48 respectively, which are rigidly secured together in any suitable manner, or the frame may be formed of one integral casting as desired. A top plate 49 and bottom plate 50 complete the box like foundation structure of the keyboard 1.

The top and bottom plates 49 and 50 are provided with slots 51 and 52 respectively through which shank portions 53 of the keys 17 extend and are frictionally held in any position to which they may be moved. Each key 17 is provided with a head 54 on which a character is displayed by any suitable means.

The shank 53 of each key 17 is provided with a vertically disposed slot 55 through which passes a retaining bar 56, extending longitudinally of each series of keys 17, said bar preventing the removal of the keys from the keyboard structure but permitting a limited vertical movement of each key with respect to the keyboard. To register a character selection on the keyboard the particular key bearing that character is pressed until the upper end of the slot 55 rests on upper edge of the bar 56, such movement of the key causes the lower end 57 of the key shank 53 to project below the plane occupied by the remainder of the keys, for purposes hereinafter more fully set forth.

Each bar 56 is provided with a pair of triangular notches 58—58 which embrace similarly formed cam bars 59—59, secured to the bottom plate 50 of the keyboard structure 1.

Each "error" key 18, is provided with a vertical centrally disposed elongated slot 60 and a short vertical slot 61 at each side thereof. The bar 56 passes through the central slot 60. One leg 62 of a bell crank lever 63 snugly fits each of the slots 61, 61. The bell crank levers 63—63 are pivoted at 64 to the plate 49. The second legs 65—65 of each pair of the bell crank levers 63—63 are connected by a pin 66 which passes through a vertical slot 67 in one end of the bar 56, intermediate the levers of each pair.

Each "error" key 18 is provided with a head and shank similar to the keys 17 and the lower end of the shank is provided with an enlargement 68 rigidly secured thereto. A flat spring 69 is provided for, and to normally maintain each key 18 in its raised or inoperative position. One end of the spring 69 is rounded and engages the lower surface of the enlargement 68 and the other end is rigidly secured to the under side of the plate 50 as shown in Fig. 20.

To withdraw a registered selection in any one series or row of keys 17, pressure is applied to the "error" key 18 of that row, which turns the associated pair of bell-crank levers 63—63 on their pivots and through the pin 66 and slot 67 a longitudinal movement of the bar 56 ensues. As the bar 56 is moved longitudinally it is also raised vertically, due to the cooperative action of the cam bars 59—59 and the notches 58—58, which raises, to their normal positions, any and all of the keys 17—17 of that series that may have been depressed. When pressure is released from the key 18 the said key, the bell cranks 63—63 and the bar 56 associated therewith are returned to their normal positions through the action of the spring 69 of that series.

The keyboard structure is provided with clearing mechanism whereby all the registrations thereon may be withdrawn simultaneously.

Each of the bars 56 is provided, at its end opposite the key 18 with an angularly disposed slot 70. A connecting rod 71 passes through the slots 70—70 of the entire series of bars 56—56, and its opposite ends are supported in angularly disposed slots 72—72 in the side bars 47 and 48 of the keyboard structure 1.

A shaft 73 is journaled in the side bars 47 and 48 and a series of levers 74 are secured thereto in a spaced relationship. Links 75—75 connect the free ends of the levers 74 to the rod 71. Suitable loose fitting spacing sleeves 76—76 are provided on the bar 71 between the bars 56—56 and the links 75—75. The shaft 73 has secured to its end adjacent the side bar 48 the clearing lever 21, by which the registration of the entire keyboard may be simultaneously withdrawn.

It will be understood that when a single key 18 is pressed the particular bar 56 associated therewith moves freely with respect to the bar 71 due to the slot 70 in said bar, however, when the clearing lever 21 is manipulated the shaft 73 is turned and through the levers 74, links 75 and the bar 71 all the bars 56 are moved longitudinally at one time, thereby restoring all the keys 17—17 to their normal inoperative positions.

The keyboard structure 1 is also equipped with a "starting" key 19 by which the automatic impressing mechanism is set into motion. The key 19 is similar in construction to the keys 17 and 18 and is provided with an additional depending stud 77, slidably mounted in the upper and lower plates 49 and 50. The stud 77 is shouldered (Fig. 22) to provide an abutment for one end of a spring 78 which surrounds the reduced portion of the stud, the lower end of the spring bearing upon the upper side of the plate 50. A limit block 79 is secured to the shank of the key 19 and prevents its withdrawal from the keyboard structure.

It will be understood that the key 19 is depressed to start operation of the impressing mechanism and upon its release it is returned immediately to its normal or inoperative position by the spring 78.

Figure 7:
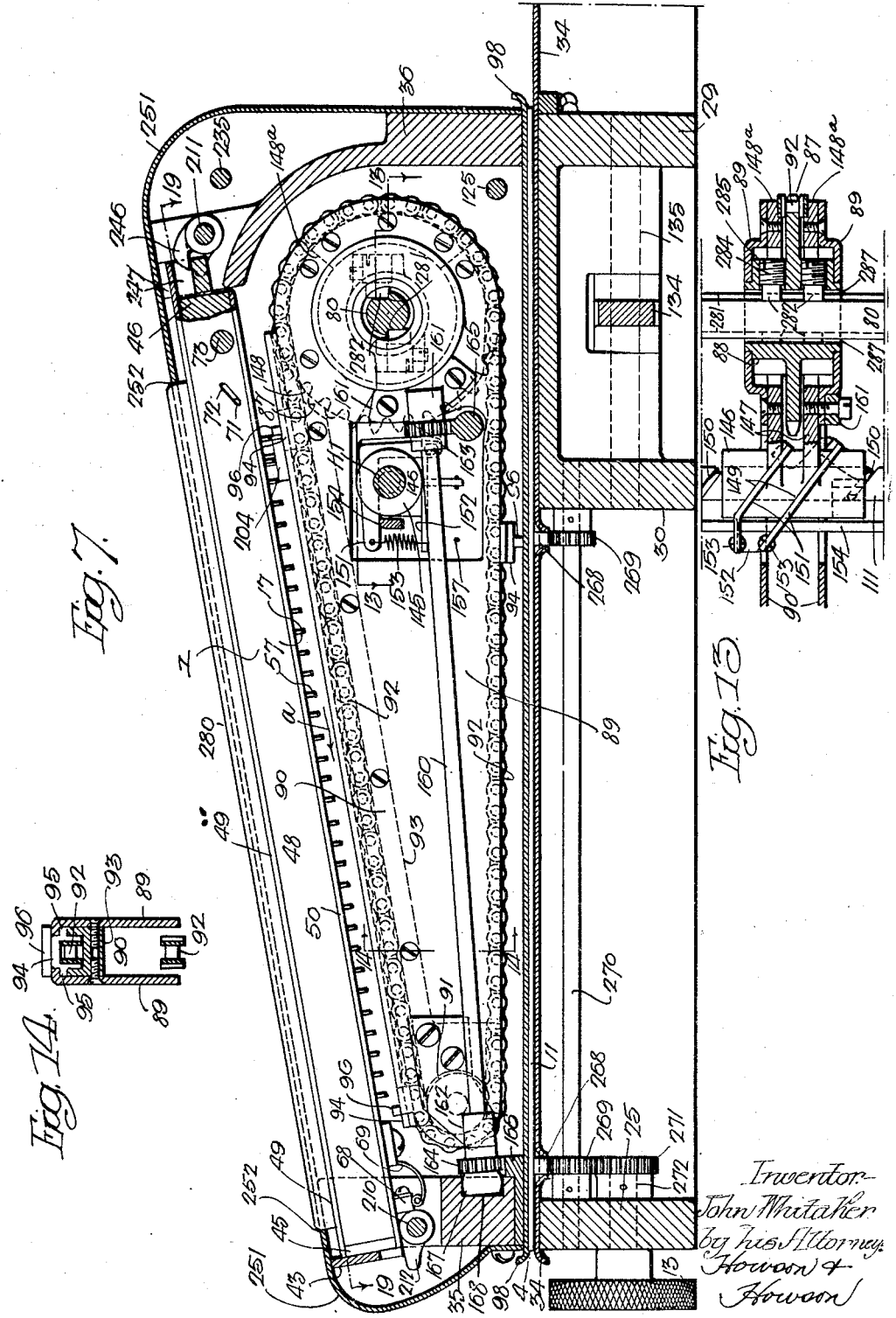
Fig. 7 is a sectional elevation taken on the line 7—7, Fig. 4.

Referring to Figs. 7, 11 and 13 it will be noted that a shaft 80 is journaled adjacent one of its ends in the wall 38 and adjacent its opposite end in a bearing 81 integral with the plate 37 and the back wall 36 of the head 2.

Suitably secured to the end of the shaft 80 adjacent the wall 38 is a flanged collar 83, in the flange of which are concentric segmental slots 84—84, through which pass lock screws 85—85 which are threaded into tapped holes in a type wheel 86 loosely mounted on the shaft 80 between the flanged collar 83 and the wall 38. This construction permits of angular adjustment between the type wheel 86 and the shaft 83 on which it is mounted.

Splined to the shaft 80 and capable of lateral movement thereon between the wall 38 and the bearing 81 is a sprocket wheel 87. The said sprocket wheel 87 is provided with an extended hub 88 at each of its sides. The hubs 88—88 are shouldered and journaled in side frames 89—89 of a control carriage 90.

The side frames 89—89 are extended toward the front wall 35 and between said side frames is suitably journaled an idler roller 91. An endless chain belt 92 passes around the sprocket wheel 87 and the roller 91 and the upper run of said chain is supported in a U shaped rail 93. The side frames 89—89 are secured to the rail 93 as shown in Figs. 7 and 14.

The chain 92 is provided with three equally spaced special links 94—94, in the present instance, the distance between said special links being equal to one circumference of the sprocket wheel 87, also being equal to the distance between the first and last shank 53 of each series or row of keys 17 of the key board 1, as shown in Fig. 7.

The links 94—94 are each provided with laterally extending ears 95—95 designed to ride upon the upper surfaces of the upright legs of the rail 93. The side frames 89—89 are inturned at their upper edges and engage the upper surfaces of the ears 95—95, thus the carriage 90 is provided with a guide for each of the links 94 and extend below and parallel to the underside of the keyboard structure 1 and the depending ends 57 of the key shanks 53. Each of the links 94—94 is provided with a single upwardly extending lug 96 at right angles to the ears 95—95, designed to engage the shank ends 57 of the keys 17 when they are depressed.

The lower run of the chain 92 is in a manner supported by a metal plate 98 secured to the underside of the front wall 35, rear wall 36, side wall 38 and the top surface of the bottom plate 37 of the head 2 and in conjunction with the plate 34 defines the passageway 4 for the checks to be written.

Secured to the shaft 80, outside the bearing 81, is a planetary gear mechanism comprising a flanged collar 100 provided with a projecting pin 101 on which is rotatably mounted a gear pinion 102. The pinion 102 meshes with a pinion 103 formed integral with a sleeve 104 on the outer end of which is secured a spiral gear wheel 105. The sleeve 104 and gear wheel 105 are free to rotate with respect to the shaft 80. The pinion 102 also meshes with internally formed teeth 106 on a ring 107.

The ring 107 is secured to a circular plate 108 rotatably mounted on the sleeve 104 and its outer face is in the form of an intermittent spur gear 109 designed to cooperate with an intermittent gear 110.

The gear 110 is secured to a spiral grooved shaft or feed screw 111 rotatably mounted at one end in the wall 38 and adjacent its opposite end in a bracket 112 secured to bottom plate 37 of the head 2.

Figure 5:
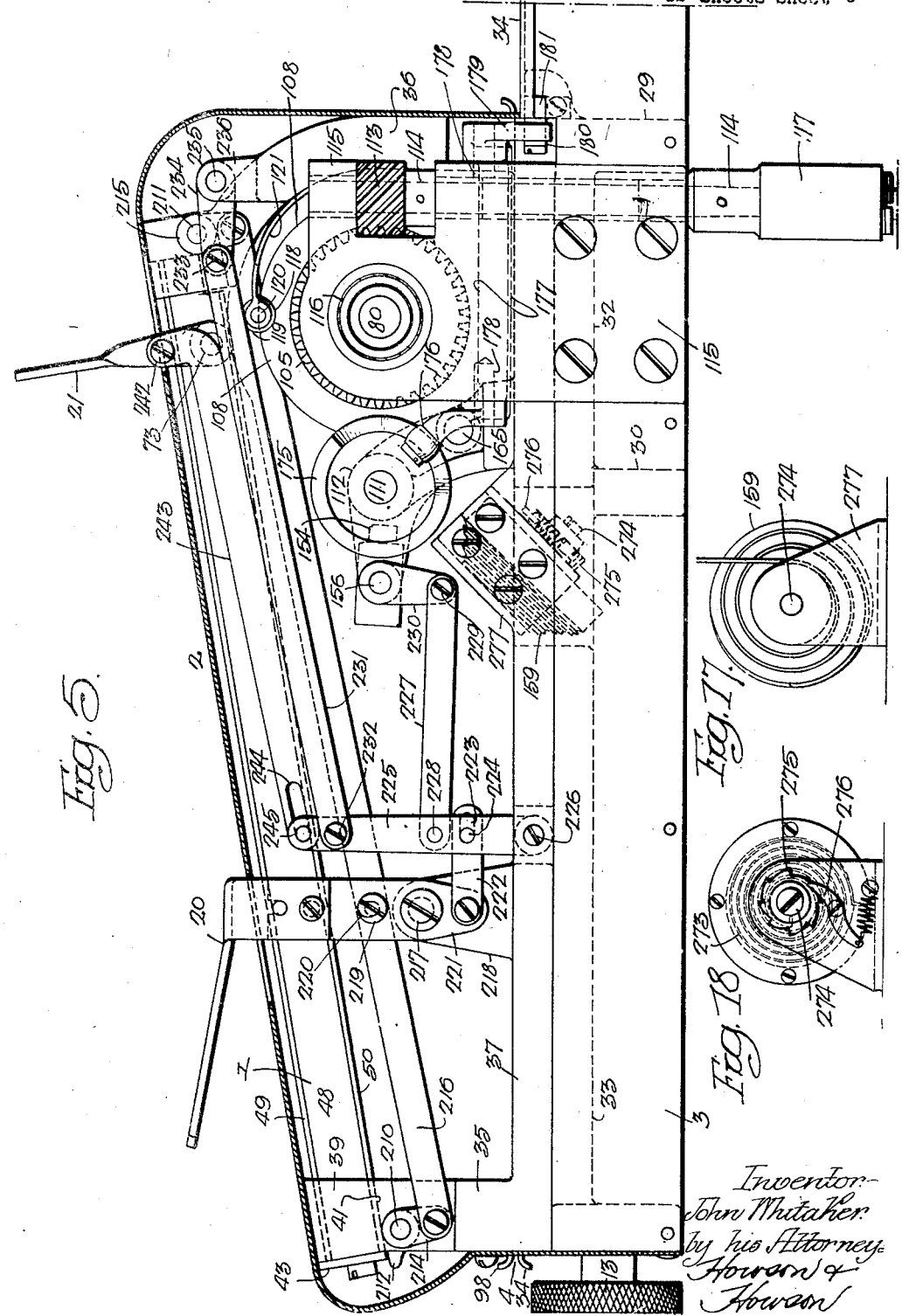
Fig. 5 is a sectional elevation taken on the line 5—5, Fig. 4.

The gear 105 meshes with a pinion 113 (Fig. 5) secured to a vertically disposed shaft 114 journaled in a bearing block 115 secured to the base structure 3. The outer end of the shaft 80 is likewise journaled in a ball bearing 116 mounted in the block 115. The shaft 114 is driven from the motor 8 by any suitable means preferably through an "overload slip clutch" 117, of any suitable type.

Figure 6:
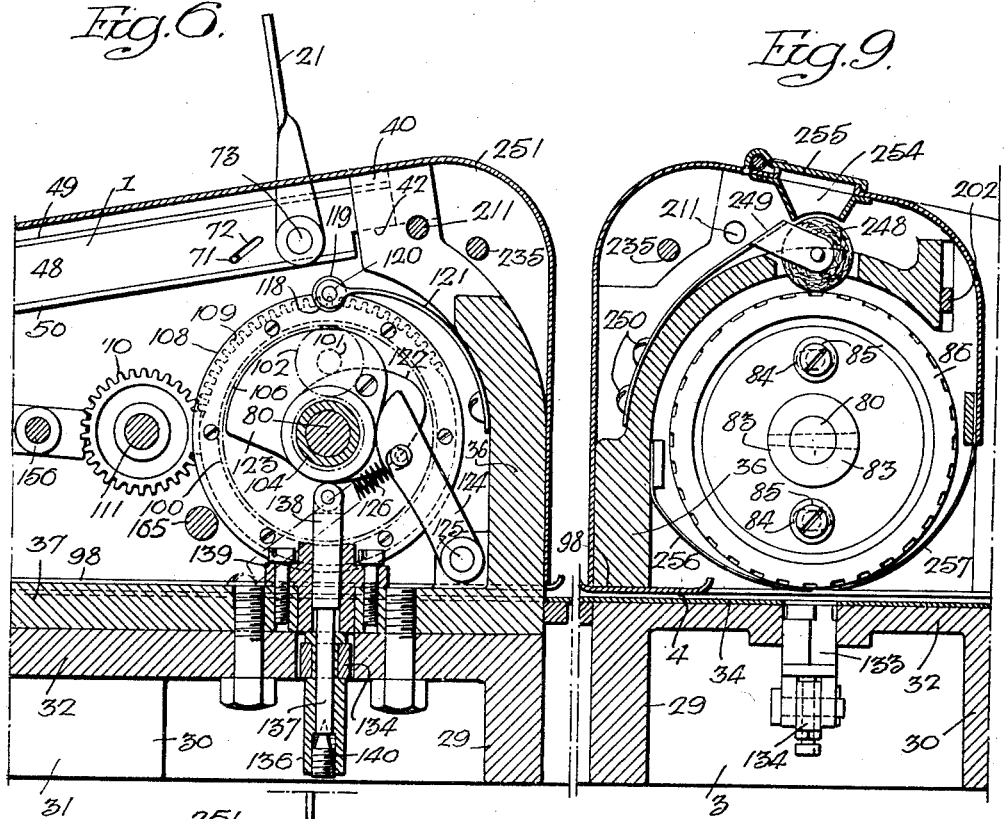
Fig. 6 is a sectional elevation taken on the line 6—6, Fig. 4.

The circular plate 108 (Fig. 6) is provided with a semi-circular depression 118 in which a roller 119 normally rests to prevent rotation of the said circular plate 108, under certain conditions. The roller 119 is rotatably mounted on a pin 120 extending laterally from a flat spring 121 secured to the rear wall 36 of the head 2.

The circular plate 108 has secured to its side adjacent the gear wheel 105 an impression cam 122 and a locking cam 123, respectively.

The locking cam 123 (Fig. 6), when rotated, operates a lever 124 secured to one end of a rock shaft 125 suitably journaled adjacent the lower edge of the back wall 36 of the head 2. A spring 126 maintains operative contact between the lever 124 and cam 123 at all times. Secured to the opposite end of the shaft 125 (Figs. 11 and 16) is a broad faced gear segment 127 which meshes with a gear pinion formed on a locking bolt 128, rotatably and slidably mounted on the wall 38. The bolt 128 has a conical forward end 129 designed to enter similarly formed cavities 130 in one side of the type roll 86. The bolt 128 is provided with a spiral groove 131 into which projects the reduced end of a screw 132 threaded into the rear wall 36.

When the cam 123 is rotated the shaft 125 is rocked, the gear segment 127 rotates the locking bolt 128 which thereby is advanced until the conical end 129 thereof enters one of the cavities 130 in the type wheel 86. The first action is to center the type to be used directly over a movable platen or anvil 133 and the final action is to prevent any rotative movement of the type wheel while the impression is being made.

The movable platen or anvil is loosely mounted on one end of a lever 134 but snugly fits within an aperture in the web 32 of the frame 3, which insures perfect alignment between said platen and the type wheel. The lever 134 is pivoted to the frame or base structure 3 at 135 and is forked at its opposite end to engage an adjusting thimble 136. The thimble 136 encircles the lower end of a plunger 137, the upper end of which is provided with a cam roller 138 which engages the impression cam 122.

The plunger 137 is slidably mounted and vertically guided in a housing 139 secured to and extending through the bottom plate 37 of the head 2. The thimble 136 is provided with an adjusting screw 140 which engages the lower end of the plunger 137 by which the degree of impression on a check may be minutely controlled. A spring 141 is provided to normally maintain the face of platen 133 in a position below the surface of the plate 34 in the passageway 4.

It will be apparent from the foregoing description that the gear wheel 105, receiving continuous rotation from the motor 8, transmits that rotation to the sleeve 104 and pinion 103. From the pinion 103 motion is imparted to the pinion 102. The gear ring 107 is held stationary, through the circular plate 108, roller 119 and spring 121, and the internal teeth 106 of said ring 107 meshing with the teeth of the pinion 102 causes the pinion 102, in rotating about the pin 101, to move said pin 101 in a concentric path about the centre of the shaft 80. The pin 101 being secured to the flanged collar 100, which in turn is secured to the shaft 80, causes the said shaft 80 to be rotated at a reduced rate of speed with respect to the gear wheel 105, but in the same direction therewith. Rotation of the shaft 80 causes a consequent rotation of the sprocket wheel 87 and a movement of the chain 92 in the direction of the arrow (a) Fig. 7.

Considering a combination of selections having been registered on the keyboard as are shown in Fig. 23, to start the automatic operation of the impressing mechanism, to write a check bearing such a face value, the operator presses the "start" key 19 which depresses the lower end 57 of the key shank 53 into the path of one of the lugs 96 of the continuously moving chain 92. When a lug 96 on said chain engages the depressed key shank, movement of the chain 92 is stopped, consequently stopping the shaft 80. Rotation of the gear roll 105, sleeve 104, the pinion 103 and the pinion 102 continues, but the pin 101 is held against rotation around the centre of the shaft 80. Fixing of the pin 101 causes the pinion 102 to rotate thereon and consequently drive the gear ring 107 and circular plate 108, in a reverse direction to the shaft 80 through the internal teeth 106 of said ring, the roller 119 being forced out of the depression 118 in the plate 108.

Rotation of the plate 108 causes rotation of the locking cam 123 and the impression cam 122, the locking cam 123 becoming effective first to secure the type wheel in correct position and the impression cam 122 becoming effective thereafter and through the plunger 137, thimble 136 and lever 134 the platen 133 is raised, thereby forcing the check overlying it to be forced against the face of the type wheel 86 and impressing on the face of the check the character positioned lowermost on the typewheel, which for the beginning of a check writing, as shown in Fig. 23, is a "sealing character."

After the impression of the "sealing character" is completed the ring 107 continues to rotate and the external teeth 109 on said ring are brought into operative engagement with the teeth of the intermittent gear wheel 110, which rotates said gear and the spiral grooved shaft or feed screw 111 secured thereto.

The carriage 90 is provided with a feed element 145 in operative engagement with the feed screw 111 and when said screw is rotated the carriage 90 is moved laterally until the lug 96 on the chain 92 is free to pass to the side of the depressed end 57 of the "start" key shank 53, whereupon the said key returns to its normal inoperative position. At this point in the operation the circular plate 108 has completed one full revolution, returning the lever 124 and plunger 137 to their inoperative positions, shown in Fig. 6, whereby the platen 133 is returned to its normal inoperative position below the plate 34 and the locking bolt 128 has released the type wheel 86. The roller 119 again has entered the depression 118 in the circular plate 108 rendering it immovable and the respective untoothed portions of the intermittent gear wheels 109 and 110 are in engagement one with the other.

The upper run of the chain 92 is now free to again move in the direction of the arrow (a) Fig. 7 until one of the lugs 96 engages a depressed end 57 of a character key in the first row or series of keys adjacent to the "start" key 19, whereupon the impression mechanism is again automatically operated as above described. The operation above described is successively repeated until the carriage 90 is moved into alignment with a row or series of keys wherein none of the keys have been depressed, whereupon the chain 92 and its associated elements will idle. The complete registration recorded on the keyboard has been impressed on the check, which it will be understood has been moved by suitable feeding mechanism step by step to present a fresh surface between the type wheel and the platen, as the writing of the check progressed.

The feed element 145 of the carriage 90 comprises a cylindrical head 146 through which the spiral shaft or feed screw 111 passes. (Figs. 7 and 13). The head is provided with a pair of rearwardly extending arms 147, 147 terminating in annular portions 148—148 which lie one at either side of the sprocket wheel 87. A portion 148$^a$ of each of these annular portions 148 is removable to permit the placing of the sprocket 87 therebetween. The side frames 89—89 of the carriage 90 are secured to the annular portions 148 as clearly shown in said figures.

The head 146 is provided with a pair of grooves 149—149, in its upper side, disposed at an angle coincident with the pitch angle of the spiral groove 150 in the shaft 111. A pair of blades 151, 151 are adapted to the grooves 149—149 and engage the spiral groove 150 of the shaft or feed screw 111. The blades 151—151 are of a right angle construction being pivoted to a plate 152 secured to the under side of the head 146, extending vertically as shown in Fig. 7 then horizontally through the grooves 149—149 as shown in Figs. 7 and 13. A retaining spring 153 extends between the free end of each of the blades 151—151 and the plate 152 for the purpose of maintaining the said blades in the groove 150 of the shaft 111.

Release of the blades 151—151 from the groove 150 may be accomplished by a bar 154, extending across the head 2 parallel to the shaft 111, and pivoted at 155 to the wall 38 of said head 2 at one of its ends, its opposite end being secured to a short shaft 156 journaled in the bracket 112. Upon rocking the shaft 156 so that the bar 154 is raised the blades 151—151 are released from the groove 150.

A flexible cable 157 is connected at one of its ends to the plate 152 of the carriage 90 and passes around a horizontally disposed sheave 158 journalled in the wall 38 and thence across the head 2 to a spiral groove faced retrieving drum 159 rotatably mounted at one side of the head 2. The drum 159 is under torsional stress at all times and upon release of the blades 151—151 from the groove 150 of the shaft 111 returns the carriage 90 to the position immediately underlying and in alignment with the "start" key 19.

In order that the carriage 90 may ride evenly and without jamming in the course of its travels across the machine I provide the carriage with an equalizing shaft 160 rotatably mounted in bearings 161—162 extending from and secured to one side of the carriage 90. Secured to opposite ends of the shaft 160 adjacent the bearings 161 and 162 are a pair of gear wheels 163 and 164 of equal pitch diameter. The gear wheel 163 meshes with the teeth of a gear rack 165 which extends across the head 2 parallel to the shaft 111 and has one of its ends secured in the side wall 38 and its opposite end on the bracket 112. The gear wheel 164 meshes with the teeth of a gear rack 166 secured to the front wall 35 of the head 2. The gear racks 165 and 166 are of equal pitch with each other and with the gear wheels 163 and 164 which insures equal movement of both ends of the carriage 90 simultaneously.

The carriage 90 is supported at one end by the head 146 riding the shaft 111, while the opposite end is supported by a roller 167 rotatably mounted on the end of the shaft 160 and riding in a groove 168 formed in the front wall 35.

A dash pot construction comprising a cylinder 169 (Fig. 15) secured in the side wall 38, and a movable piston element 170 absorb the shock of the carriage being returned by the spring operated retrieving drum 159. A spring 171 is placed behind the piston element 170 to extend the said piston when the carriage moves away from its initial position. Breathing of the dash pot is permitted through a restricted opening 172 in the base thereof.

Feeding of a check being written is performed by a cam 175, secured to the end of the spiral grooved shaft 111, which operates against one arm 176 of a lever 177 pivoted at 178 to the bearing block 115. The other arm 179 of said lever engages a roller 180 on one end of a slide bar 181, slidably mounted in the side walls 27 and 28 of the base structure 3. The opposite end of the slide bar 181 is connected by a link 182 to a disc 183 loosely mounted on the outer end of a transverse shaft 184 journaled in the bars 29 and 30 of the base structure 3. Pivoted to the disc 183 is a spring pressed pawl 185 which engages the teeth of a ratchet wheel 186 secured to the shaft 184. Knurled faced feed wheels 187—187 are secured to the shaft 184 and project through openings in the web 32 and plate 34 one at either side of the platen 133 and slightly in advance thereof. A spring pressed detent pawl 189 is pivoted to the bar 29 and engages the teeth of the ratchet wheel 186 in a manner to prevent backward movement of the feed wheels 187, 187. The feeding mechanism is returned to its normal position by a spring 188 connected to the slide bar 181 and the frame bar 29.

Pressure rollers 190—190 are provided to insure a grip of the check by the feed wheels 187, 187. The rollers are each rotatably mounted in one leg of an inverted U shaped carrier 191 slidably mounted on an end plate 192 suitably secured to the back wall 36 of the head 2. A rod 193 projects upwardly from the carrier 191 through a bearing 194 and terminates in a head 195 which is provided with a pin 196 extending into an angularly disposed slot 197 in the lower end 198 of the release lever 16 which is pivoted at 199 to the end plate 192. A spring 200 is coiled about the rod 193 between the carrier 191 and the bearing 194 and tends to maintain said carrier in a lowered position. When the lever 16 is operated the pin 196 moves within the slot 197 thereby raising the pressure rollers 190 from the feed wheels 187 and is retained in that position by an offset end 201 of the said slot 197.

Figure 4:
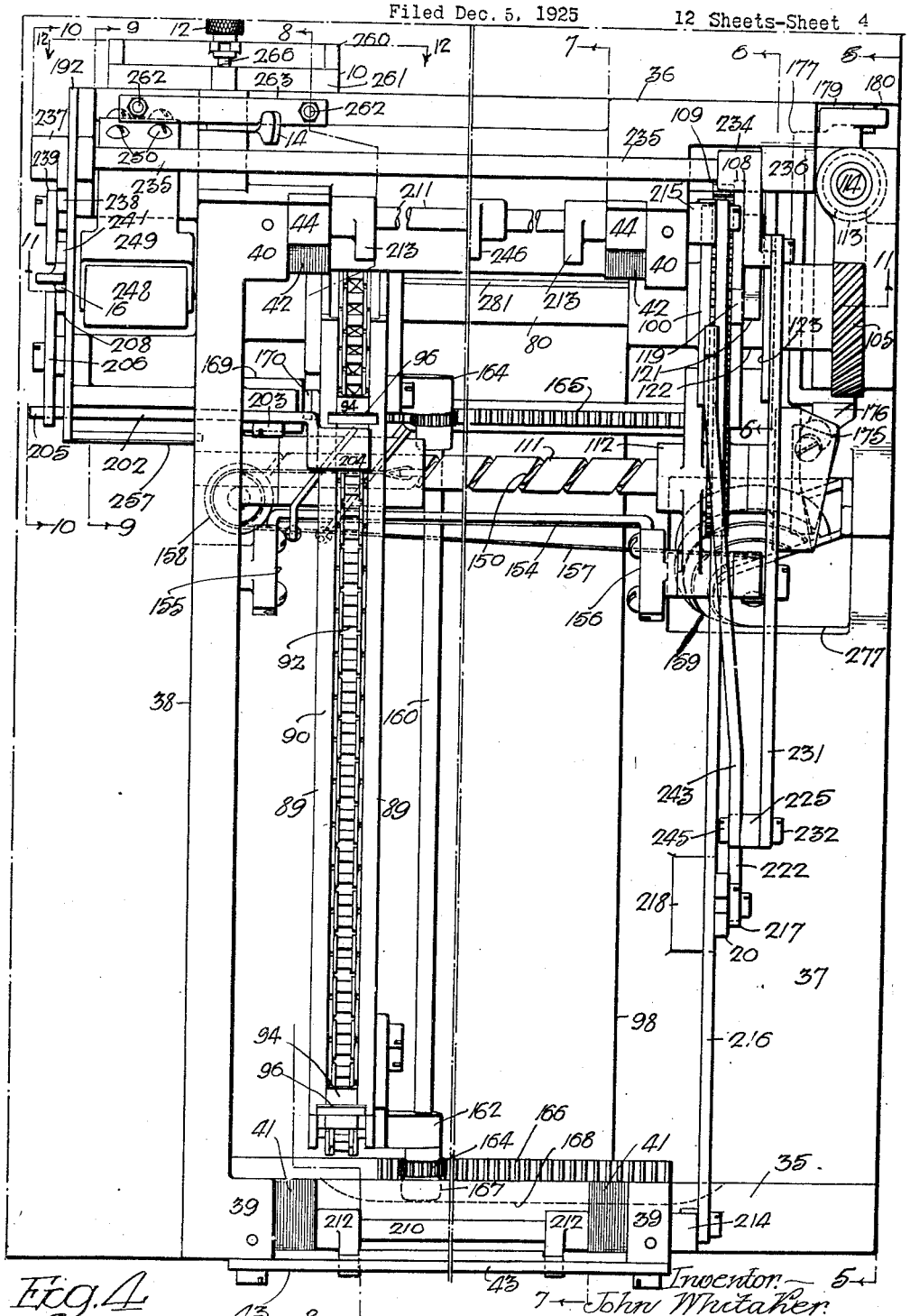
Fig. 4 is a plan view of the operating head with the outer casing removed.
Figure 8:
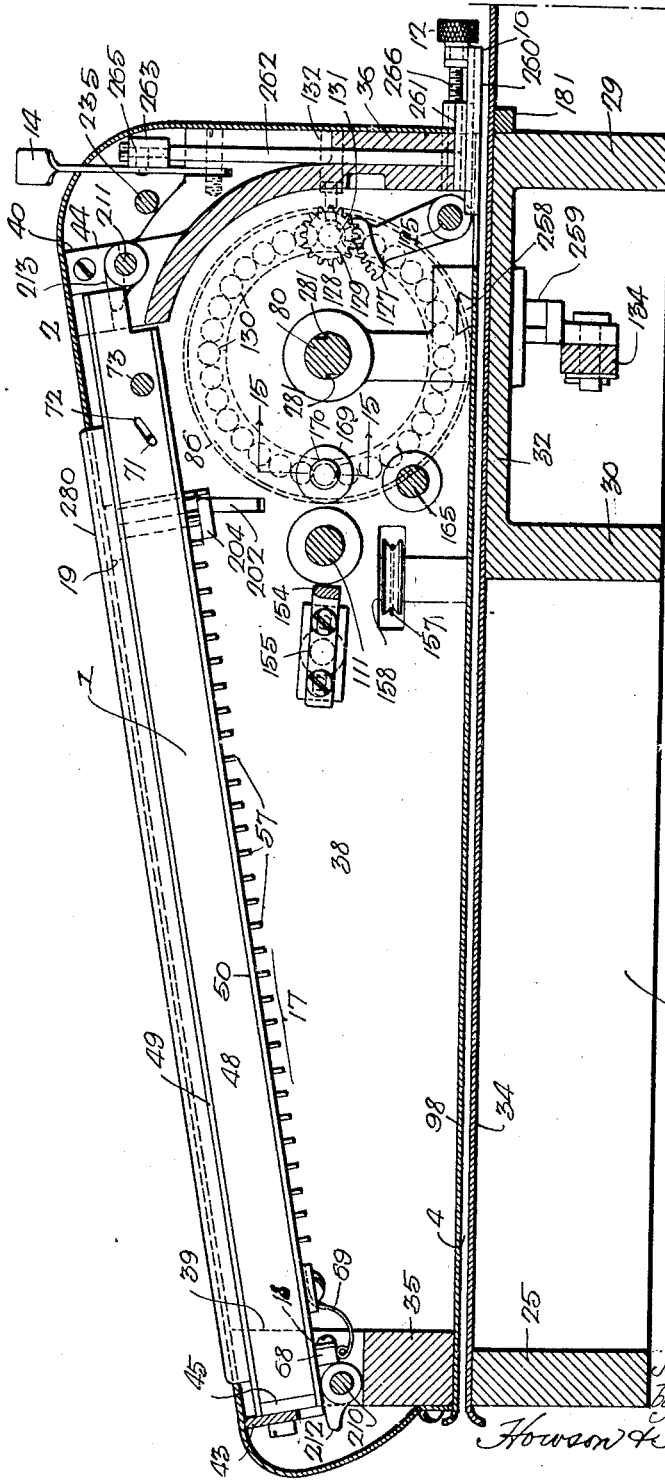
Fig. 8 is a sectional elevation taken on the line 8—8, Fig. 4.

To insure the feeding of the check to be written by having the pressure rollers 190—190 in contact with the upper face of the check and thereby pressing the check against the knurled face of the feed wheels 187—187, I provide a safety device (Figs. 4, 8 and 10) comprising a lever 202 pivoted at 203 to a lug on the side wall 38, having one end 204 underlying the depending rod 77 of the "start" key 19, and the opposite end 205 underlying one leg of a bell crank lever 206 pivoted at 207 to the end plate 192. The other leg of the lever 206 is provided with a roller 208 which engages the front side of the lever 16 and when the "start" key 19 is depressed the levers 202 and 206 are operated to lower the pressure rollers 190—190 into operative engagement with the check to be written.

In order to write a second check, identical with one having just been completed, it is not necessary to reregister the character selections therefor on the keyboard, mechanism being provided by which the carriage 90 is returned to the "start" position, operable by the "repeat" lever 20.

Rotatably mounted in the upright guide projections 39—39 and 40—40 extending respectively from the front and rear walls 35 and 36 of the head 2 are two shafts 210 and 211, (Figs. 4, 5, 7, 8 and 11). Secured to the shaft 210 and underlying the front bar 45 of the keyboard structure 1 is a pair of cam levers 212—212, and secured to the shaft 211, underlying the rear bar 46 of said keyboard structure is a pair of cam levers 213, 213. The shafts 210 and 211 each project beyond the guides 39 and 40 on one side of the head 2 and have secured to such projecting ends levers 214 and 215 respectively. A link 216 connects the free ends of these levers and lies in a plane immediately adjacent the body of the repeat lever 20, said lever 20 being pivoted at 217 to a lug 218 projecting from the bottom plate 37 of the head 2.

The lever 20 is provided with a vertically extending slot 219 through which projects a stud screw 220 which is secured in the link 216. Operation of the lever 20 raises the entire keyboard structure 1, through the shafts 210 and 211 and cam levers 212 and 213, to such an extent that the ends 57 of all the depressed keys 17 are above the plane of travel of the lugs 96 on the chain 92.

The lever 20 has a second arm 221 to which is pivoted a link 222 whose opposite end is slotted at 223 to receive a stud 224 secured in a lever 225 which is pivoted at 226 to the bottom plate 37 of the head 2. A second link 227 is pivoted at 228 to the lever 225, its opposite end being pivoted at 229 to a lever 230 secured to one end of the short shaft 156 which controls the release bar 154. When the bar 154 is raised, by operation of the lever 20, it releases the blades 151—151 from the spiral groove 150 of the shaft 111 and permits the carriage 90 to be returned to the "start" position, under the influence of the spring operated retrieving drum 159.

In order to insure the release of the completed check from the feed wheels 187—187 and the pressure wheels 190—190 the said pressure wheels are automatically raised when the "repeat" lever 20 is operated. A link 231 has one of its ends pivoted at 232 to the lever 225 and its opposite end pivoted at 233 to the free end of a lever 234 which is secured to one end of a shaft 235 rotatably mounted in a bearing 236 projecting from the rear wall 36 of the head 2. The opposite end of the shaft 235 is mounted in a bearing formed in the end plate 192 (Fig. 10). Secured to the shaft 235 adjacent the plate 192 is a cam lever 237 adapted to engage a roller 238 rotatably mounted on a lever 239 pivoted at 240 to the plate 192. The lever 239 is provided with a second roller 241 adapted to engage the rear edge of the lever 16 and when the "repeat" lever 20 is operated the lever 16 is moved forward through the train mechanism above described thereby raising the pressure wheels 190—190 permitting withdrawal of the completed check.

After a check has been written and a check of different face value is to be written thereafter, the registration keys 17 are all returned to their normal inoperative positions by operation of the clearing lever 21 as hereinbefore described and it is preferable to utilize this operation to reset the impressing mechanism for the succeeding check. Pivoted to the clearing lever 21 at 242 is a link 243 whose opposite end is slotted at 244 to receive a stud 245 secured to the upper end of the lever 225. Operation of the lever 21 will move the lever 225 and thereby operate the release bar 154 and the pressure roller release mechanism as above described, but, due to the slot 223 in the lever 222 the "repeat" lever will be unaffected. Likewise, when the "repeat" lever 20 is operated the lever 21 remains unaffected due to the slot 244 in the link 243.

To obviate any tendency of the keyboard structure to raise, due to a pressure exerted thereon by a lug 96 of the chain 92 coming into contact with one of the depressed ends 57 of the keys 17, the shaft 211 (Figs. 4, 7 and 11) is provided with a latch lever 246, secured thereto, whose free end enters a cavity 247 in the bar 46 and engages the lower side thereof. When the shaft 211 is turned the latch lever 246 moves out of the cavity 247 and permits the keyboard to be raised.

Referring to Figs. 9 and 11 it will be noted that the type wheel is supplied with ink or other marking medium from a felt roller 248 rotatably mounted in the free forked end of a spring lever 249 secured at 250 to the rear wall 36 of the head 2.

The entire head 2 is enclosed in a suitable casing 251 which is provided with an opening 252 through which the keyboard 1 is exposed to view. I prefer to secure the casing at each corner of the aperture 252 to the upright guide members 39—39, 40—40, as indicated at 253—253, for the purpose of limiting the vertical movement of the keyboard 1. The casing 251 is also secured at other points, preferably along its lower edge, in any desired manner, and it is provided with openings through which the various levers extend. An opening 254 is provided in the casing through which the marking medium is applied to the felt roller 248, said opening being normally closed by a spring controlled cap 255.

Spring guard plates 256 and 257 are suitably secured on the head 2 and underlie the type wheel 86 exposing only the character between their adjacent edges, that is to be impressed upon the face of the check.

It will be noted upon reference to Fig. 23 that the space on the face of the check reserved for the name of "payee" is serrated but it is not inked except for the name itself which is placed thereon in any suitable manner previous to being placed in the passageway 4 of the machine. The serration above noted is accomplished by means of a fixed platen 258 secured in the underside of the wall 38 (Fig. 8) and a cooperating movable platen 259 pivoted to the lever 134 and slidable in an opening in the web 32 of the base structure 3.

The check guide or positioning means 10 (Figs. 8 and 12) may consist of a plate 260 dovetailed to a second plate 261 secured to the lower ends of a pair of rods 262—262 slidably mounted in the rear wall 36 and being connected at their upper ends by a cross bar 263. The cross bar 263 is provided with a groove 264 into which projects a pin 265 secured to the lever 14 which is pivoted to the back wall 36. The plate 260 is adjustable on the plate 261 by means of the knob 12 which is secured to a screw 266 threaded into the plate 261 and being provided with a groove into which projects the legs of a forked projection 267 on the plate 260.

The check guide 11 may comprise a thin blade substantially of a thickness equal to the measurement of the passageway 4 to which may be secured a pair of gear racks 268—268 slidably mounted in the base structure 3 and adapted to be engaged by gear wheels 269—269 secured to a shaft 270 rotatably mounted in the base structure 3. A gear 271 is secured to the inside end of a short shaft 272 rotatably mounted in the front bar 25 of the base structure 3, the knob 13 being secured to the outer end of said shaft. The gear 271 meshes with one of the gear wheels 269.

The spring controlled retrieving drum 159 forms no part of the present invention but is employed as above noted to return the carriage 90 to the "start" position on the head 2. The said drum comprises a hollow body having a partially tapered face provided with a spiral groove to receive the cable 157, one end of which is secured to the hollow body of the drum. Within the said hollow body is a spiral spring 273 one end of which is secured thereto and the opposite end is secured to the spindle 274 on which the drum rotates. Torsion is applied to the spring 273 by turning of the spindle 274 to which is secured a ratchet wheel 275 adapted to be engaged by a pawl 276 pivoted to the drum support 277 whereby torsion once applied is retained.

Upon reference to Fig. 2 it will be noted that the individual rows or series of keys 17 are separated by a vertical rib 280 which extends above the normal level of the heads 54 of the said keys and prevents the pressing of keys of adjacent rows accidentally by striking therebetween. However, it does not matter how many of the keys of any one row are pressed as long as the one nearest the top of the row is the one it is desired to impress upon a check, due to the fact that the lugs 96 of the chain 92 move in a direction from the top toward the bottom of the row and after engaging the one nearest the top, thereafter moves laterally to engage the uppermost of the depressed keys in the adjacent row of keys.

The spline between the shaft 80 and the sprocket 87 is of novel construction comprising shoulders 281 extending longitudinally of said shaft adapted to be engaged by rollers 282—282 rotatably mounted on spindles 283 formed on the ends of screws 284—284 adapted to apertured lugs 285—285 formed on the hub 88 of the sprocket wheel 87. The shaft 80 passes through an aperture 287 in said hub 88, the aperture being of a larger diameter than said shaft in order that the shaft may extend therethrough without forming contact therewith.

I claim:

1. A check writing machine comprising a keyboard structure provided with a plurality of series of registration keys and a single independent starting key; power operated impressing mechanism; a controlling element for said mechanism, normally movable in alignment with said starting key and adapted to engage said starting key when it is depressed, whereby the said power operated impressing mechanism is set into motion.

2. A check writing machine comprising a keyboard structure provided with a plurality of series of registration keys and a single independent starting key; power operated impressing mechanism; a control element therefor normally aligned with said starting key and continuously moving with respect thereto, adapted to engage said key when it is depressed and thereby set into motion a cycle of operations of the said power operated impressing mechanism; means for successively moving said control element laterally into alignment with the next adjacent series of keys immediately preceding the completion of each of said cycles of operations; and means for returning said control element to its initial position after a check has been completely written.

3. A check writing machine comprising a keyboard structure provided with a plurality of series of registration keys and an independent starting key; power operated impressing mechanism including a type wheel and a movable platen; a controlling element, for said power operated impressing mechanism, normally movable in alignment with said starting key and adapted to engage said starting key when it is depressed, whereby the said power operated impressing mechanism is set into motion to cause said platen to engage said type wheel.

4. A check writing machine comprising a keyboard structure; power operated impressing mechanism including a planetary gear mechanism whereby one element of said mechanism is continuously moving and the remaining elements are quiescent; and a control element for said impressing mechanism, interposed between said mechanism and said keyboard, whereby upon operation of said keyboard said continuously moving element of said impressing mechanism is definitely stopped and the normally quiescent elements thereof are set into motion to perform a definite cycle of operations.

5. A check writing machine comprising a keyboard structure provided with a plurality of series of registration keys projecting below said keyboard structure in a manner whereby their projecting ends lie in a definite inoperative plane; power operated impressing mechanism; a control element interposed between said keyboard and said power operated mechanism, operatively connected to said mechanism and including a carriage extending beneath and vertically aligned with one of said series of keys, a continuously moving endless chain mounted in said carriage and provided with a plurality of projections movable in alignment with said series of keys in a plane immediately below said inoperative plane and adapted to engage any one of the keys of said series which may be depressed below said normal inoperative plane, to operate said impressing mechanism.

6. A check writing machine comprising a keyboard, power operated impressing mechanism and a controlling element interposed therebetween; said controlling element comprising a carriage, a spirally grooved rotatable shaft passing therethrough, and a feed element engaging said grooved shaft, whereby said carriage is moved laterally, beneath said keyboard.

7. A check writing machine comprising a keyboard, power operated impressing mechanism and a controlling element interposed therebetween, said controlling element comprising a carriage; a feed screw passing through said carriage; a feed element engaging said feed screw, whereby said carriage is moved laterally beneath said keyboard; a release bar, whereby said feed element and feed screw are disengaged; and means for returning said carriage to its initial position below said keyboard.

8. In a check writing machine, a movable carriage provided with a feed element comprising a cylindrical head secured therein; a spirally grooved shaft extending through said head; grooves in said head; blades pivoted to said head and extending through said grooves into the spiral groove of said shaft; retaining springs; and a release bar extending under the free ends of said blades.

9. In a check writing machine, a movable carriage; feeding mechanism therefor; means for insuring equal movement of both ends of said carriage as it is moved by said feeding mechanism, comprising a shaft rotatably mounted on and extending longitudinally of said carriage; a gear wheel secured to said shaft adjacent each end thereof and meshing respectively with the teeth of a gear rack rigidly secured in said machine.

10. In a check writing machine, a movable carriage comprising side frames; a feed head for said carriage, secured to said side frame and slidably mounted on a feed screw for said carriage, which supports said carriage at one of its ends; a roller rotatably mounted on the opposite end of said carriage and adapted to a groove formed in the machine, whereby said end of the carriage is supported.

11. In a check writing machine, a movable carriage suitably supported in said machine and comprising side frames, a sprocket wheel provided with an elongated hub extending outwardly from each side of the sprocket wheel and reduced in diameter adjacent its respective ends, said reduced portions being adapted to bearings formed in said side frames.

12. In a check writing machine, a movable carriage suitably supported in said machine and comprising side frames; a sprocket wheel rotatably mounted in said side frames; an idler roller journaled in said carriage; an endless chain adapted to said sprocket and idler roller and comprising a series of regular links and a plurality of special links, a rail for supporting the upper run of said chain, provided with side walls between which said chain passes; laterally extending ears on said special links adapted to slide on the upper edges of said side walls, inturned flanges on said carriage side frames engaging the upper surfaces of said ears and a vertically extending projection on each special link extending above said side frames at a right angle to said ears.

13. In a check writing machine, a movable carriage; a sprocket wheel suitably supported in said carriage, a hub on said sprocket wheel; an axial aperture of definite diameter in said hub, a shaft of lesser diameter than said aperture extending through said aperture; shoulders formed in said shaft and extending longitudinally thereof; rollers, rotatably mounted in the hub of said sprocket wheel, operatively engaging said shoulders, by which said sprocket wheel is splined to said shaft, to be turned thereby and move longitudinally thereof.

14. In a check writing machine, a planetary gear mechanism comprising a continuously rotating externally toothed driving member; an internally toothed normally quiescent member; a normally rotating shaft axially aligned with and journaled in said driving member; a flanged collar secured to said shaft; a stud secured to said flanged collar in the flange thereof; a gear pinion rotatably mounted on said stud and meshing with the external teeth of said continuously rotating driving member and the internal teeth of said normally quiescent member, whereby motion is imparted to the normally rotating shaft.

15. A check writing machine comprising a base structure; an operating head secured thereto; a check passageway formed therebetween; a planetary gear mechanism in said head comprising a continuously rotating driving member; a normally quiescent member and a normally rotating shaft; a type wheel secured to said shaft in said head above said passageway; a platen in said base structure below said passageway; a cam for operating said platen secured to said quiescent member; and means for stopping said normally rotating shaft and type wheel whereby said normally quiescent member becomes active and rotates, causing operative engagement between said platen and said type wheel.

16. A check writing machine comprising a base structure, an operating head secured thereto; a check passageway formed therebetween; a planetary gear mechanism in said head comprising a continuously rotating driving member, a normally quiescent member and a normally rotating shaft; a type wheel secured to said shaft; a locking bolt in said head adapted to engage said type wheel; a cam on said quiescent member for operating said locking bolt; and means for stopping said normally rotating shaft and type wheel whereby said normally quiescent member becomes active and rotates, causing said locking bolt to engage and lock said type wheel against rotation.

17. A check writing machine comprising an operating head; a keyboard in said operating head; a plurality of series of recording keys in said keyboards; a starting key in said keyboard; power operated impressing mechanism including a planetary gear mechanism comprising a continuously rotating driving member, a normally quiescent member and a normally rotating shaft; a control element, interposed between said keyboard and said impressing mechanism, operatively associated with said shaft; a feed screw for said control element rotatably mounted in said head; an intermittent gear on said feed screw; an intermittent gear on said quiescent member meshing with said feed screw gear; projections on said control element adapted to engage a depressed key of said keyboard, whereby said rotating shaft is stopped and said quiescent member becomes active, thereby rotating said feed screw gear and said feed screw, causing said control element to move laterally from an alignment and engagement with one of said keys into alignment with the next adjacent series of keys, for subsequent engagement with any one of the keys thereof which may be depressed.

18. A keyboard structure comprising a framework; a plurality of series of registration keys mounted in said framework; a withdrawal key for each series of said registration keys; each key comprising a head and a shank; a slot in each key shank; a retaining bar extending through the slots of each series of key shanks; means operable by said withdrawal key for moving said retaining bar longitudinally of said series of keys; and means for moving said bar vertically, to return the keys of said series to their normal positions.

19. A keyboard structure comprising a framework; a plurality of series of registration keys mounted in said framework; a withdrawal key for each series; a retaining bar for each series; means operable by said withdrawal key for moving said bar longitudinally; a slot in each retaining bar; a connecting rod passing through the slot of each bar; a clearing shaft mounted in said framework; levers secured to said clearing shaft; links connecting said levers and said connecting rod; a clearing lever secured to said clearing shaft, whereby all the said retaining bars are simultaneously moved longitudinally; and means whereby all the said retaining bars are simultaneously moved vertically.

20. A keyboard structure comprising a framework; a plurality of series of registration keys mounted in said framework, each key comprising a head and a shank; a withdrawal key for each series; a centrally located slot in the shank of said withdrawal key; a short slot at each side of said central slot; a retaining bar for each series extending through the central slot of said withdrawal key; a slot in each retaining bar; a bell crank lever at each side of said bar, pivoted to said framework; a pin extending through the said slot in said retaining bar and secured at each end in one leg of each of said bell cranks; a second leg of each of said bell cranks extending into one of the side slots in said key shank, for moving said bar longitudinally; means for moving said bar vertically; and means for returning said bar and said withdrawal key to their normal positions.

21. A keyboard structue comprising a framework; a plurality of individually separated series of registration keys mounted in said framework; a withdrawal key for each series mounted in said framework; a starting key independently mounted in said framework and comprising a head and a shank; a retaining block secured to said shank within said framework; a shouldered stud mounted in said framework, below the head of said key; and a spring adapted to support said key in a normally elevated position within said keyboard.

22. A check writing machine comprising a keyboard structure; a plurality of series of registration keys thereon; whereby the amount to be written on a check may be recorded; a starting key on said keyboard, whereby the writing of said recorded amount may be started and subsequently automatically carried on to completion; power operated impressing mechanism; a control element associated with said impressing mechanism and adapted to engage the depressed recording keys of said keyboard; means for writing a series of checks from said single registration, including mechanism whereby the depressed keys of said keyboard can be raised above the operating plane of said control element, said control element returned to its initial position and the said power operated impressing mechanism reset for the start of another writing, under the control of a single "repeat" lever.

23. A check writing machine comprising a base structure and an operating head; a keyboard structure in said head; keys in said keyboard adapted to be depressed with respect thereto; a control element normally operable under said keyboard; guides in said head within which said keyboard normally rests; cam levers underlying said keyboard; shafts journaled in said guides to which said cam levers are secured; levers on the ends of the respective shafts; a link connecting said levers; a repeat lever operably connected to said link and pivoted in said head; whereby said keyboard is raised bodily until the depressed keys thereof are above the operating level of said control element.

24. A check writing machine comprising a base structure and an operating head; a keyboard structure in said head; a control element underlying said keyboard normally moving in one direction with respect to and adapted to engage the depressed keys of said keyboard; means for moving said control element at right angles to its normal direction of movement; means for raising said keyboard and its depressed keys above the normal operating plane of said control element; and means for returning said control element to its initial operating position with respect to said keyboard.

25. A check writing machine comprising a base structure and an operating head; a keyboard structure in said head; a control element in said head, normally movable in one direction with respect to said keyboard; means for moving said control element step by step at right angles to its normal direction of movement; means for raising said keyboard with respect to said control element; means for returning said control element to its initial position with respect to said keyboard; and means for absorbing the shock caused by the said return of the control element to its initial position.

26. A check writing machine comprising a base structure and an operating head; a keyboard structure therein; registration keys on said keyboard adapted to be depressed with respect thereto; check feeding mechanism in said base structure; pressure wheels in said operating head cooperative with said feeding mechanism; power operated impressing mechanism; a control element for said impressing mechanism interposed between said impressing mechanism and said keyboard; means for moving said control element step by step with respect to said keyboard; and means, operable by a single repeat control lever for raising said keyboard above the operating plane of said control element, returning said control element to its initial operating position, and releasing said pressure wheels from said feeding mechanism, in order that an additional check may be written from the existing registration on the keyboard.

27. A check writing machine comprising a base structure and an operating head; a keyboard structure therein; registration keys on said keyboard adapted to be depressed with respect thereto; check feeding mechanism in said base structure; pressure wheels in said operating head cooperative with said feeding mechanism; power operated impressing mechanism; a control element, for said impressing mechanism, interposed between said impressing mechanism and said keyboard; means for moving said control element step by step with respect to said keyboard; and means, operable by a single clearing lever for withdrawing the entire registration from said keyboard, returning said control element to its initial operating position and releasing said pressure wheels from said feeding mechanism, in order that the machine may be in readiness to receive a new registration for the writing of a check of different face value from that just completed.

28. A check writing machine comprising a keyboard and power operated impressing mechanism including a type wheel and a platen movable into and out of operative engagement with said type wheel; a cam for effecting said operative engagement, a plunger engaging said cam; a pivoted lever on which said platen is mounted; an adjusting thimble engaged by said lever and surrounding said plunger and an adjusting screw in said thimble engaging said plunger whereby the operating degree of pressure between said platen and said type wheel may be minutely controlled.

JOHN WHITAKER.